May 22, 1951  W. R. CALLOWAY  2,553,894
CRANKCASE CLEANER

Filed March 21, 1950  2 Sheets-Sheet 1

Walter R. Calloway
INVENTOR.

BY *Clarence A. O'Brien
and Harvey B. Jacobson*
Attorneys

May 22, 1951  W. R. CALLOWAY  2,553,894
CRANKCASE CLEANER

Filed March 21, 1950  2 Sheets-Sheet 2

Walter R. Calloway
INVENTOR.

BY *Clarence A. O'Brien
and Harvey B. Jacobson*
Attorneys

Patented May 22, 1951

2,553,894

UNITED STATES PATENT OFFICE 2,553,894

CRANKCASE CLEANER

Walter R. Calloway, Norton, Va.

Application March 21, 1950, Serial No. 150,906

3 Claims. (Cl. 123—41.86)

1

This invention relates to the class of internal combustion engines, and more particularly to a crankcase cleaner for the withdrawal of deleterious gases resulting from the combustion cycle of the engine.

Due to the incomplete and unsuccessful elimination from internal combustion engines of vapors, gases, and moisture produced during the operation of the engine, these vapors resulting from the combustion cycle enter the crankcase as a result of leakage between the pistons and cylinder walls. The result has a deteriorating effect on the lubricating oil and produces harmful deposits of sludge and carbon which interfere with the efficient operation of the engine and shortens the life of the parts thereof. It is therefore the primary object of this invention to effectively remove fumes and vapors from the crankcase of automotive vehicles, trucks and the like so as to dissipate such fumes to the surrounding atmosphere, and prevent them from entering the passenger compartment of an automotive vehicle.

Another object of the invention is to provide an improved crankcase cleaner that will be safe in operation, will not interfere in any way with the normal operation of the engine and may be quickly fitted to as a component of any conventional automobile or truck engine.

Still further objects of the invention reside in the provision of a crankcase cleaner that is strong, durable, highly efficient in operation, which makes the use of the air passing through the grille of the automotive vehicle to power the cleaner, and which is capable of being readily attached to the automobile by even an unskilled mechanic together with the fact that it may be cheaply and easily produced.

These, together with the various ancillary objects of the invention which will become apparent as the following description proceeds, are attained by this crankcase cleaner, a preferred embodiment of which has been illustrated in the accompanying drawings, by way of example only, wherein.

Figure 4:
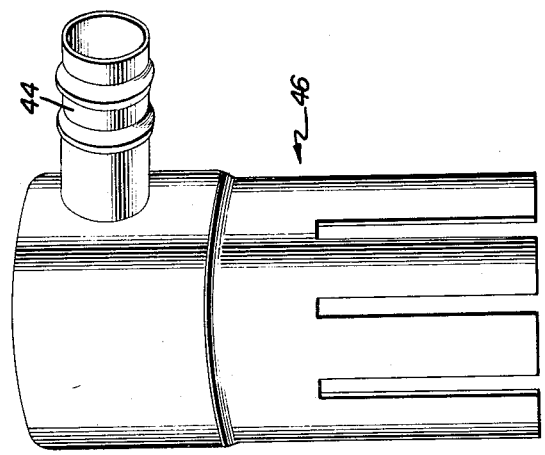
Figure 4 is a perspective view of the cap member adapted to be inserted in the oil filler pipe of the crankcase of the vehicle and which comprises another element of the invention.
Figure 1:
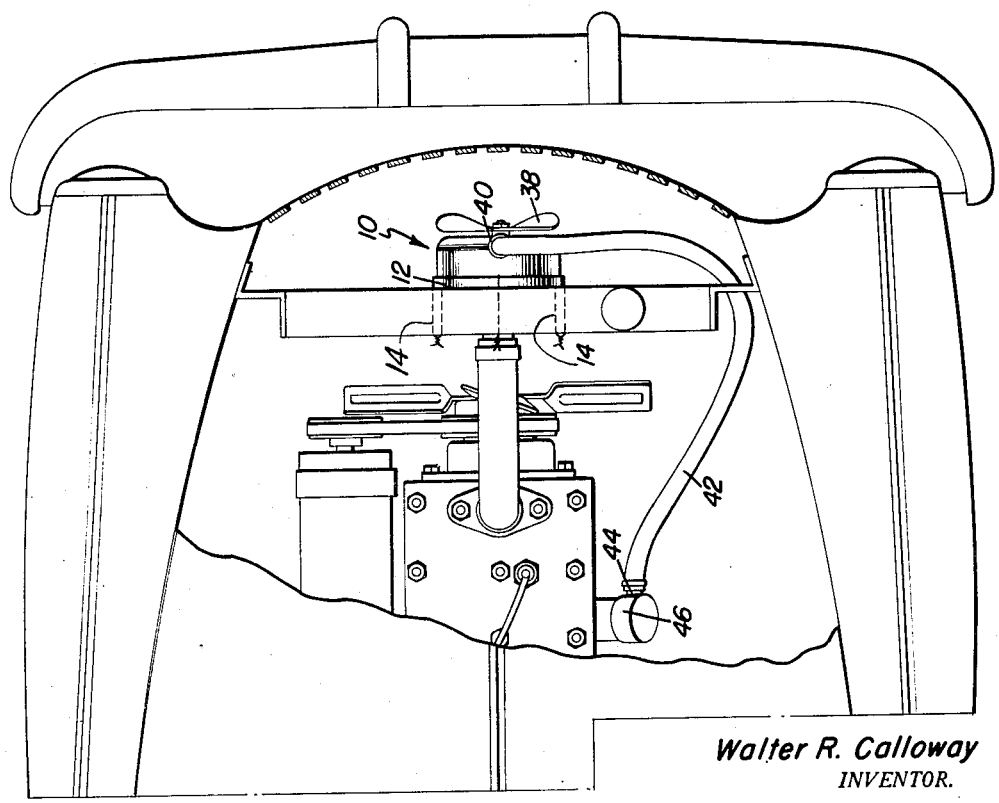
Figure 1 is a top plan view of a portion of an automotive vehicle showing the crankcase cleaner operatively installed thereon.
Figure 3:
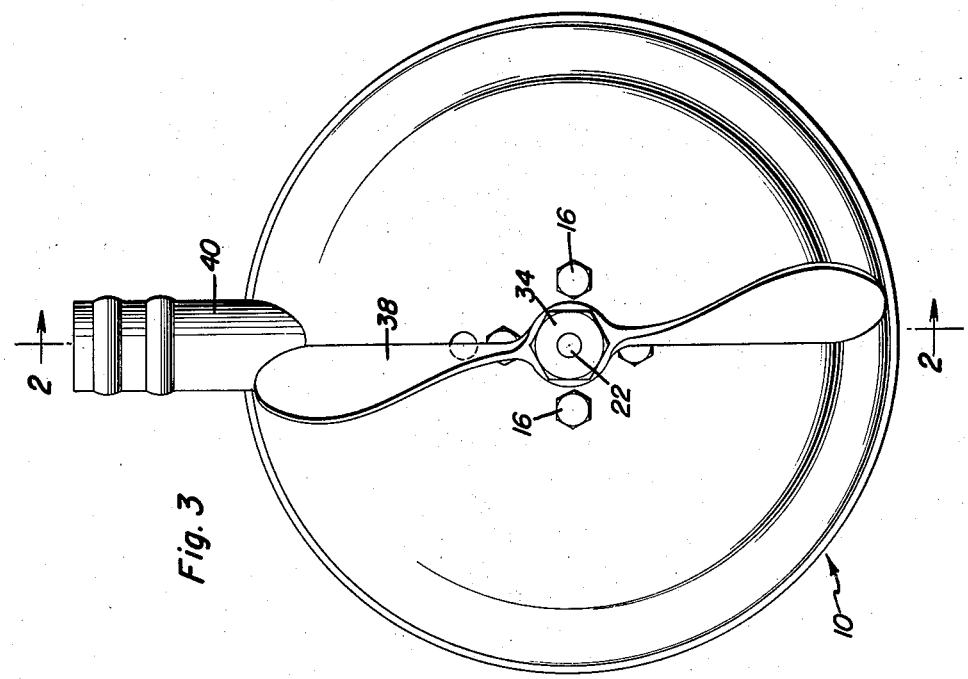
Figure 3 is a top elevational view of the chamber and exhaust means comprising one element of the present invention.
Figure 2:
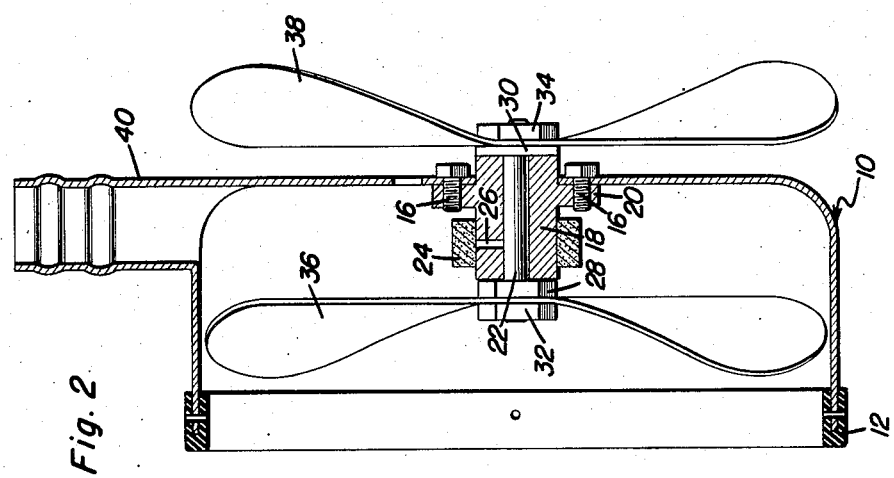
Figure 2 is a vertical sectional view as taken along line 2—2 in Figure 3.

With continuing reference to the accompanying drawings wherein like reference numerals designate similar parts throughout the various views, reference numeral 10 generally designates a chamber which is provided with a resilient gasket 12 about its periphery and which chamber is adapted to be attached to the radiator of the automobile by means of tie wires 14 which are passed through the mesh of the radiator and then brought together and twisted on the engine side of the radiator so as to secure the chamber to the radiator.

Secured to the front wall of the chamber by means of bolts 16 is a bearing member 18 which is provided with an annular flange 20 through which the bolt 16 extends. A shaft 22 is rotatably mounted in the bearing member 18 and is effectively lubricated by lubricating oils passing from the felt oil retainer 24 through apertures 26 extending through the bearing member 18. The shaft 22 is provided with shoulders 28 and 30 adjacent the ends thereof and the ends are threaded for reception of nuts 32 and 34 which securely hold fans 36 and 38 against the shoulders of the fan shaft. The fan 38 is actuated by the air passing through the air intake grille of the automobile thus acting in a manner similar to that of a windmill. The fan 38 drives the shaft 22 which in turn rotates the exhaust type fan blade 36. Hence a vacuum is created within the chamber 10, and by means of the inlet pipe 40 attached to and in communication with the chamber 10, and by means of the hose 42 which is attached to the outlet pipe 40 and to an inlet pipe 44 of the barrel filler pipe cap member 46, the noxious gases in the crankcase are sucked into the chamber 10 and thence disposed through the meshwork of the radiator and dissipated into the atmosphere underneath the vehicle.

It is to be realized that the various parts of the device may be made from aluminum or other light metal. The parts may be rigidly secured to each other by use of screws, rivets, welding or any other suitable means of fastening as desired.

By using this invention, carbon monoxide gases and other noxious gases will be prevented from entering the passenger compartment of the vehicle where it is detrimental to the health of the passengers while also being odorous and objectionable.

Since from the foregoing the construction and advantages of this crankcase cleaner are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

Having described the invention, what is claimed as new is:

1. A crankcase cleaner for an internal combustion engine comprising a chamber adapted to be attached to the radiator of an automotive vehicle behind the air intake grille of said vehicle, suction means in said chamber, means operatively connecting said chamber with the oil filler pipe of the crankcase of the vehicle, said means including a shaft journaled in said chamber and extending out of said chamber, an exhaust fan on said shaft in said chamber, and a drive fan secured to that portion of said chamber extending out of said chamber for actuating said exhaust fan.

2. A crankcase cleaner for an internal combustion engine comprising a chamber adapted to be attached to the radiator of an automotive vehicle behind the air intake grille of said vehicle, suction means in said chamber, means operatively connecting said chamber with the oil filler pipe of the crankcase of the vehicle, said means including a shaft journaled in said chamber and extending out of said chamber, an exhaust fan on said shaft in said chamber, a drive fan secured to that portion of said chamber extending out of said chamber for actuating said exhaust fan, and a hose in communication with said chamber connecting said chamber with a cap member adapted to be inserted into said oil filler pipe.

3. A crankcase cleaner for an internal combustion engine comprising a chamber adapted to be attached to the radiator of an automotive vehicle behind the air intake grille of said vehicle, suction means in said chamber, and a hose in communication with said chamber connecting said chamber with a cap member adapted to be inserted into the oil filler pipe of the crankcase of the vehicle.

WALTER R. CALLOWAY.

REFERENCES CITED

The following references are of record in the file of this patent:

UNITED STATES PATENTS

| Number | Name | Date |
|---|---|---|
| 811,757 | Apple | Feb. 6, 1906 |
| 1,806,442 | Bell et al. | May 19, 1931 |